United States Patent
Hanson et al.

(10) Patent No.: US 12,105,787 B1
(45) Date of Patent: Oct. 1, 2024

(54) PAIRED SMART RINGS FOR ACCESSING RESOURCES

(71) Applicant: Wells Fargo Bank, N.A., San Francisco, CA (US)

(72) Inventors: Carrie Anne Hanson, Charlotte, NC (US); Debashis Ghosh, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 704 days.

(21) Appl. No.: 17/247,144

(22) Filed: Dec. 1, 2020

(51) Int. Cl.
| | |
|---|---|
| *G06F 21/34* | (2013.01) |
| *G06F 3/01* | (2006.01) |
| *G06Q 20/32* | (2012.01) |
| *G06Q 20/38* | (2012.01) |
| *G06Q 20/40* | (2012.01) |
| *G06Q 40/02* | (2023.01) |
| *G07C 9/00* | (2020.01) |

(Continued)

(52) U.S. Cl.
CPC .............. *G06F 21/34* (2013.01); *G06F 3/017* (2013.01); *G06Q 20/321* (2020.05); *G06Q 20/3821* (2013.01); *G06Q 20/405* (2013.01); *G06Q 40/02* (2013.01); *G07C 9/00309* (2013.01); *G07C 9/00912* (2013.01); *H04B 1/385* (2013.01); *H04W 76/14* (2018.02); *G06F 2221/2137* (2013.01); *H04B 2001/3861* (2013.01)

(58) Field of Classification Search
CPC .. G06F 21/34; G06F 3/017; G06F 2221/2137; G06Q 20/321; G06Q 20/3821; G06Q 20/405; G06Q 40/02; G07C 9/00309; G07C 9/00912; H04B 1/385; H04B 2001/3861; H04W 76/14
See application file for complete search history.

(56) References Cited

U.S. PATENT DOCUMENTS

| | | |
|---|---|---|
| 8,493,189 B2 | 7/2013 | Suzuki |
| 9,189,901 B2 | 11/2015 | Agrafioti et al. |
| 9,349,235 B2 | 5/2016 | Agrafioti et al. |

(Continued)

FOREIGN PATENT DOCUMENTS

WO   WO-2017091594 A1 *   6/2017   ........... G06Q 20/102

OTHER PUBLICATIONS

Ghiani, Giuseppe, et al., "(Abstract) Vibrotactile feedback to aid blind users of mobile guides", Journal of Visual Languages & Computing 20 (5) pp. 305-317, (2009), 2 pgs.

(Continued)

*Primary Examiner* — Meng Li
(74) *Attorney, Agent, or Firm* — SCHWEGMAN LUNDBERG &WOESSNER, P.A.

(57) ABSTRACT

Disclosed are embodiments for pairing wearable electronic devices, such as smart rings. The paired smart rings are configured so as to provide access to certain resources requiring a higher level of security. In some embodiments, a credential is sharable between the two devices. Thus, a bank manager is able to transfer a credential providing access to bank resources to a second bank employee. The bank manager is able to configure is time and/or use limit on the transferred credential. Thus, for example, by transferring the credential, the bank manager is able to delete certain authority to the bank employee while also limiting that authority as appropriate.

14 Claims, 9 Drawing Sheets

(51) Int. Cl.
*H04B 1/3827* (2015.01)
*H04W 76/14* (2018.01)

(56) References Cited

U.S. PATENT DOCUMENTS

| | | | |
|---|---|---|---|
| 9,606,624 B2 | 3/2017 | Cruz-hernandez et al. | |
| 9,729,575 B1* | 8/2017 | Stoner | H04L 63/062 |
| 9,829,338 B2 | 11/2017 | Ward | |
| 10,043,125 B2* | 8/2018 | Park | H04M 1/72412 |
| 10,108,272 B1* | 10/2018 | DeBates | G06F 1/1694 |
| 10,347,144 B2 | 7/2019 | Subiakto | |
| 10,423,214 B2 | 9/2019 | Mistry et al. | |
| 10,444,834 B2 | 10/2019 | Vescovi et al. | |
| 10,448,887 B2 | 10/2019 | Danson et al. | |
| 10,449,445 B2 | 10/2019 | Brav et al. | |
| 10,506,317 B2 | 12/2019 | Carroll | |
| 10,553,048 B2* | 2/2020 | McLear | G07C 9/28 |
| 10,657,527 B1* | 5/2020 | Easley | G06Q 20/20 |
| 10,943,308 B1* | 3/2021 | Brandt | G10L 15/26 |
| 11,146,944 B1* | 10/2021 | Guru | H04W 4/50 |
| 2009/0251407 A1 | 10/2009 | Flake et al. | |
| 2012/0025947 A1* | 2/2012 | Sinha | G07C 9/28 340/5.6 |
| 2015/0121496 A1* | 4/2015 | Caldeira De Andrada | H04L 63/08 726/7 |
| 2015/0241976 A1 | 8/2015 | Zhao et al. | |
| 2015/0277559 A1 | 10/2015 | Vescovi et al. | |
| 2015/0287412 A1 | 10/2015 | Tang | |
| 2016/0021485 A1* | 1/2016 | Sallas | H04W 40/02 455/41.3 |
| 2016/0034887 A1* | 2/2016 | Lee | G09G 5/12 705/39 |
| 2016/0134737 A1 | 5/2016 | Pulletikurty | |
| 2016/0147309 A1* | 5/2016 | Li | G06F 1/163 345/156 |
| 2016/0260274 A1* | 9/2016 | Kuenzi | E05B 43/005 |
| 2016/0317060 A1 | 11/2016 | Connor | |
| 2017/0061422 A1* | 3/2017 | Castinado | G06Q 20/405 |
| 2017/0103360 A1 | 4/2017 | Ristock et al. | |
| 2017/0201521 A1* | 7/2017 | Bruno | H04L 63/107 |
| 2017/0337546 A1* | 11/2017 | Holmes | G06Q 40/00 |
| 2018/0070231 A1* | 3/2018 | Barbu | H04W 12/06 |
| 2018/0123629 A1 | 5/2018 | Wetzig | |
| 2018/0137483 A1* | 5/2018 | McCann | G06Q 20/385 |
| 2018/0198783 A1* | 7/2018 | Liu | H04W 76/10 |
| 2018/0270638 A1 | 9/2018 | Segal | |
| 2018/0309580 A1* | 10/2018 | Jeon | H04L 9/0643 |
| 2019/0069781 A1 | 3/2019 | Kim et al. | |
| 2019/0155385 A1 | 5/2019 | Lim et al. | |
| 2019/0158671 A1 | 5/2019 | Feast | |
| 2019/0324536 A1 | 10/2019 | Forest et al. | |
| 2019/0327225 A1* | 10/2019 | Wahlberg | H04L 63/102 |
| 2019/0361414 A1* | 11/2019 | Davis | G07C 9/00309 |
| 2019/0384354 A1 | 12/2019 | Von Badinski et al. | |
| 2019/0391612 A1 | 12/2019 | Stotler | |
| 2019/0391645 A1 | 12/2019 | Vescovi et al. | |
| 2020/0103980 A1* | 4/2020 | Katz | B60K 35/00 |
| 2020/0106617 A1* | 4/2020 | Rule | G06F 21/602 |
| 2020/0134332 A1* | 4/2020 | Vossoughi | H04W 4/023 |
| 2020/0387945 A1* | 12/2020 | Sadhankar | G06Q 20/20 |
| 2021/0028928 A1* | 1/2021 | Hariharan | H04L 63/10 |
| 2021/0076204 A1* | 3/2021 | Goyal | H04L 67/306 |
| 2021/0127071 A1* | 4/2021 | Rebien | H04N 7/18 |
| 2021/0229630 A1* | 7/2021 | Kramar | H04W 12/08 |
| 2021/0357529 A1* | 11/2021 | Kravitz | G06F 3/04847 |
| 2022/0300664 A1* | 9/2022 | Connors | H04L 63/104 |
| 2023/0106544 A1* | 4/2023 | Williams | G06Q 30/0185 705/40 |

OTHER PUBLICATIONS

Meliones, Apostolos, et al., "Blind MuseumTourer: A system for self-guided tours in museums and blind indoor navigation", Technologies 6 (4), [Online]. Retrieved from the Internet: <URL: https://www.mdpi.com/2227-7080/6/1/4/pdf>, (2018), 1-31.

Satpute, Shantanu, "FingerSight: A Vibrotactile Wearable Ring to Help the Blind Locate and Reach Objects in Peripersonal Space", Thesis, University of Pittsburgh, [Online]. Retrieved from the Internet: <URL: http://d-scholarship.pitt.edu/36227/1/Satpute_April8_ETD.pdf>, (2019), 85 pgs.

Shoval, Shraga, et al., "Computerized obstacle avoidance systems for the blind and visually impaired", Intelligent systems and technologies in rehabilitation engineering, (2000), 25 pgs.

Zeng, Limin, et al., "HapticRein: Design and Development of an Interactive Haptic Rein for a Guidance Robot", International Conference on Computers Helping People with Special Needs, (2018), 14 pgs.

* cited by examiner

PAIRED SMART RINGS FOR ACCESSING RESOURCES

BACKGROUND

Authenticating access to resources via electronic means is common in the modern age. Electronic cards have provided access to office buildings for many years. Mobile banking has opened up additional opportunities for electronic access. For example, possession of a mobile phone provides an ability to purchase many items using only the phone itself, with perhaps entry of a passcode or other validation.

DETAILED DESCRIPTION

Figure 1:
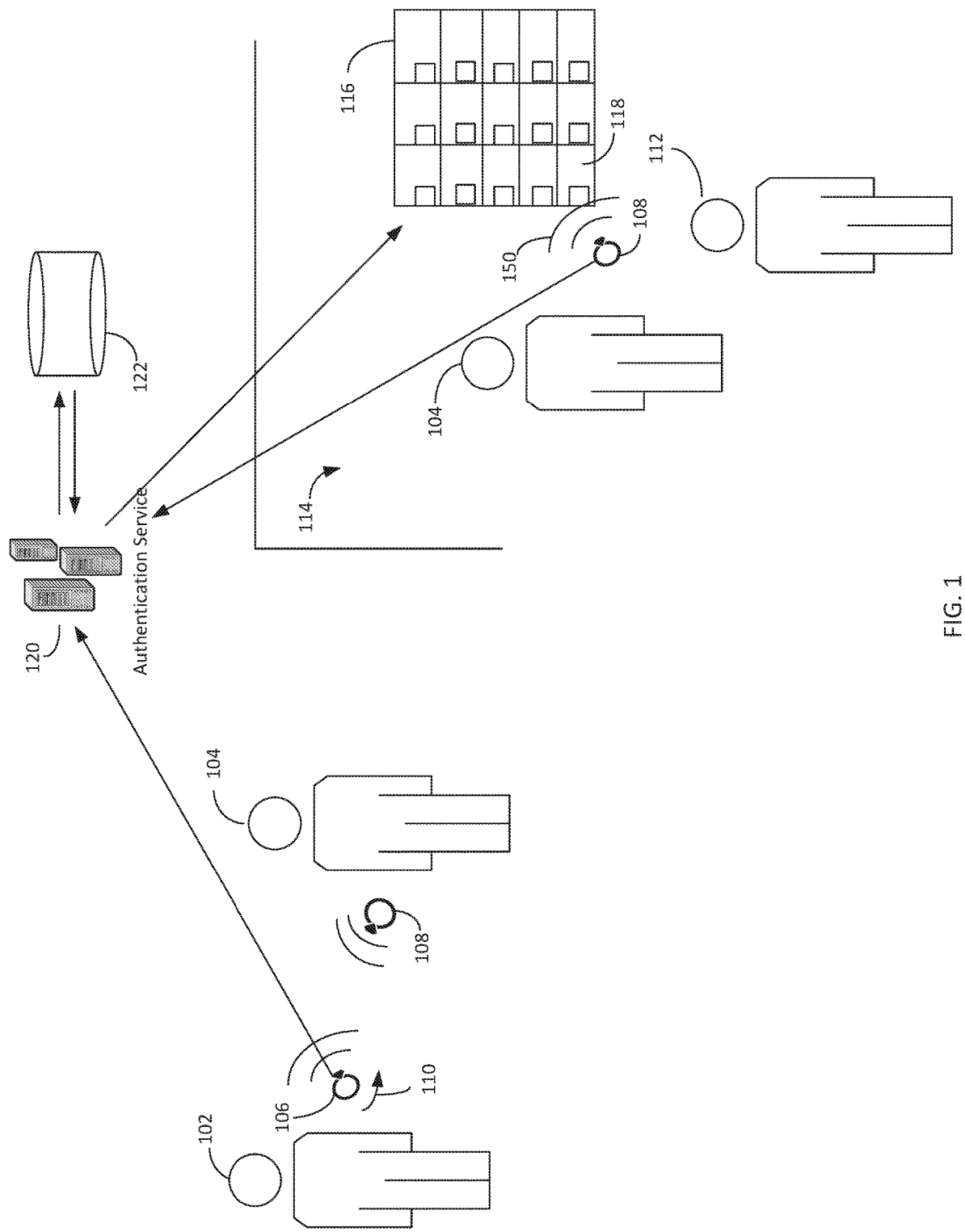
FIG. 1 is an overview diagram of a banking environment implementing one or more of the disclosed embodiments.

As discussed above, use of electronic means for authenticating access to resources is common in the modern age. One technical problem that arises in authentication access via electronic means is a relative difficulty in sharing access to resources. For example, before electronic locks became common, access to security facilities or other resources was provided by a physical key. While the physical key had some security disadvantages, sharing the key with others was a relatively easy process. If, for example, a worker planned to be out of the office for a period of time, the key could be physically "loaned" to another employee or individual such that those resources were available as needed.

Because electronic access to resources is very often tied to a particular user or computer account, sharing access of a first user with a second user is generally not possible. To accomplish this, the first user might need to contact a computer administrator to discuss why the access to the resource needs to be shared with the second user. A time delay might be experienced until the computer administrator was available to address the request to share the resource. A further coordination challenge is introduced by a requirement to share the access for some period of time. For example, some electronic systems do not establish expiration times for electronic access, and thus, after the time has elapsed, additional manual intervention is frequently needed to remove the shared access. It is somewhat common for the revocation of electronic access to be neglected, thus resulting in potentially long term access to resources that exposes the resources unnecessarily to a risk of compromise. When contrasting these existing electronic solutions to the traditional use of keys, the electronic solution represents a decrease in convenience and in some cases, security itself. For example, when shared access via a key based solution is terminated, the key is returned by the person to which is was loaned, and possession of the key remains with the original authorized user. There is no need to work through an administrator, and no risk that multiple individuals will have access to the protected resource over the long term.

The disclosed embodiments provide improved methods of authenticating users to provide for access to one or more resources. Some embodiments make use of a wearable electronic device, such as an electronic wearable ring, to store and communicate credential information that is used to access electronic resources, and/or to share the credential information with one or more other wearable devices. This sharing of electronic credential information is used, in some embodiments, to facilitate shared access to those resources.

As one example discussed further below, some of the disclosed embodiments provide for sharing credential information from a first wearable electronic device to a second wearable electronic device. The shared credential includes, in some embodiments an expiration time or a limited use count that controls for how long or for how many uses the credential is valid for access to a resource. The example provided below describes how a manager at a bank can employ this capability to share their access to bank resources, such as a bank vault, safe deposit boxes, or even an internal or exterior door of the bank facility, with another coworker on a limited basis.

Other embodiments provide for sharing of credentials between wearable electronic devices as a method of transferring monetary currency or value between users. For example, a first wearable electronic device is configured, in some embodiments, to assign a monetary value to a credential. The monetary value is transferred, in some embodiments, via an account associated with the first wearable electronic device or at least associated with a user of the first wearable electronic device. The credential with the associated monetary value is then transferred to a second wearable electronic device. The second wearable electronic device is then able to purchase items based on the monetary value. Some embodiments allow the first wearable electronic device to place restrictions on the credential's monetary value before transferring the credential to the second wearable electronic device. For example, a daily or weekly spending limit is associated with the monetary balance in at least some embodiments.

Some other embodiments ensure security of resources by requiring multiple wearable electronic devices before access is granted. In traditional security systems, two keys, issued to two separate individuals, might have provided for this type of resource access. The disclosed embodiments provide for resources to be configured such that multiple electronic credentials are necessary before access to the resource is granted. This capability provides for some surprising capabilities. As one example discussed below, permission for a parent to pick up a child from a childcare center can be provided by requiring a credential from both a wearable electronic device in possession of the parent and a second wearable electronic device in possession of the child. An access control device requires, within a predefined time period, credentials from each of the first and second wearable electronic devices, and then confirms the child can leave the childcare facility.

Thus, the disclosed embodiments provide a solution to the technical problem described above, by facilitating the sharing of access credentials between individuals in a controlled manner that does not require approval from a centralized authority. The ease of use provided by these capabilities ensures an overall increase in security, by incentivizing users to work within the security framework and not attempting to subvert it to accomplish their objectives.

FIG. 1 is an overview diagram of a banking environment implementing one or more of the disclosed embodiments. FIG. 1 shows a bank manager 102 and another bank employee 104. The bank manager 102 is wearing a first wearable electronic device 106. In the embodiment illustrated in FIG. 1, the wearable electronic device is a ring worn on a finger. The bank employee 104 is wearing a second wearable electronic device 108. The second wearable electronic device 108 is also illustrated as a ring that is worn on a finger. FIG. 1 shows that the bank manager 102 initiates a transfer of a credential from the first wearable electronic device 106 to the second wearable electronic device 108.

In some embodiments, the transferred credential control access to one or more financial resources. For example, in some embodiments, the credential controls access to one or more of a bank vault, one or more safety deposit boxes within the bank vault, other secured containers within the bank, or other financial resources.

In some embodiments, the bank manager 102 controls the transfer of the credential from the first wearable electronic device 106 to the second wearable electronic device 108 via a gesture 110. For example, in some embodiments, the gesture 110 is a shaking hands gesture, "fist bump" gesture, or a twisting gesture.

In some embodiments, the second wearable electronic device 108 establishes communication with the second wearable electronic device 108 based on a near field communication technology. Once communication is established, various gestures made by the bank manager 102 and/or the bank employee 104 control communication between the two devices, such as which type of information is communicated and in which direction said information is communicated. In some embodiments, a defined gesture initiates a transfer of a credential from the first wearable electronic device 106 to the second wearable electronic device 108.

In some embodiments, the credential transferred to the bank employee 104 from the bank manager 102 has a validity time period and/or an expiration date/time. Thus, for example, if the bank manager 102 seeks to provide the bank employee 104 with access to the safe deposit boxes 116 for a limited time period, the bank manager sets the time period via, in some embodiments, additional gestures such as the gesture 110. In some embodiments, the wearable electric device is configured separately, for example, via a separate blue tooth connection to a smart phone or personal computer. In these embodiments, time limits for transferred credentials are configured, in some embodiments, as the user interface provided by these devices is, in some respects, superior to user interfaces available via the first wearable electronic device 106 independently. In some embodiments, the transferred credential is configured for a defined number of uses by the transferee device. The defined number is any number in various embodiments, such as a single use, two uses, three uses, four uses, or any number of uses.

After receiving the credential from the bank manager 102, FIG. 1 shows the bank employee 104 escorting a bank customer 112 to a vault area 114. Within the vault area 114 is a set of safe deposit boxes 116. The bank employee is able to open a safe deposit box 118 of the set of the safe deposit boxes 116. In some embodiments, the opening of the safe deposit box 118 is contingent on it receiving the credential provided by the bank employee 104 and a second credential provided by the bank customer 112. As illustrated, credential transfer 150 is between the bank employee 104 and the safe deposit box 118, and credential transfer 150 is between the bank customer 112.

Figure 2:
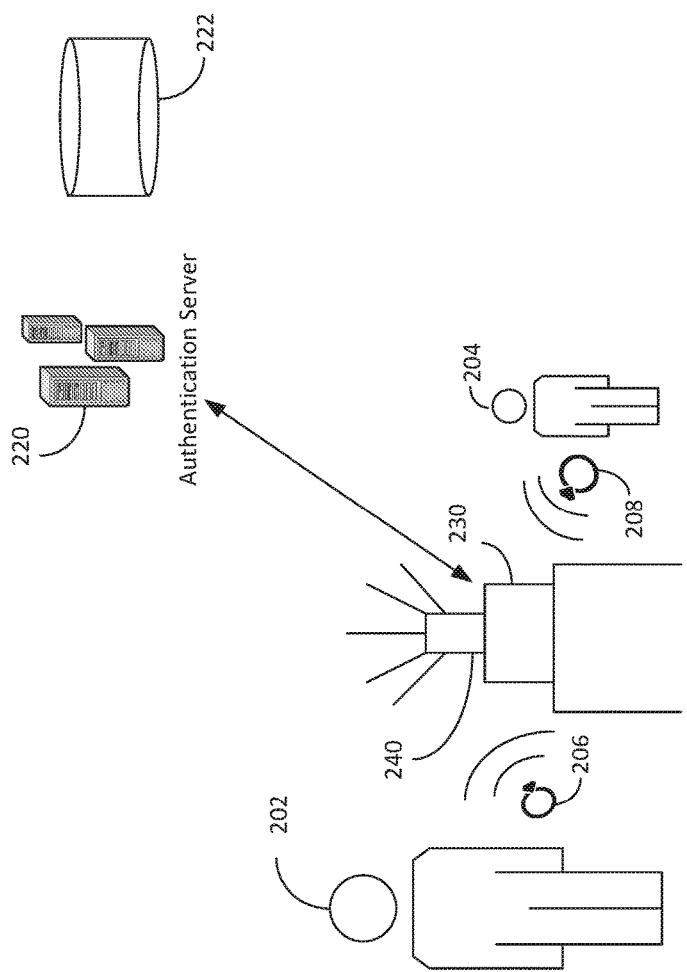
FIG. 2 is a second overview diagram showing transfer, in at least one of the disclosed embodiments, from a wearable device to a second wearable device.

FIG. 2 is a second overview diagram showing the pairing of two credentials to authenticate access to a resource. FIG. 2 shows a parent 202 and a child 204. The parent 202 is wearing a wearable electronic device 206. The child 204 is also wearing a wearable electronic device 208.

Also shown in FIG. 2 is an access control device 230. The access control device 230 is a specialized device in some embodiments and in other embodiments the authentication device is a personal computer, smart phone/mobile device, or other electronic device. In some embodiments, the authentication device is a bank vault, safe deposit box, teller cash drawer, interior door lock, exterior door lock, or other lock mechanism.

FIG. 2 shows both the parent 202 and the child 204 presenting a credential, via their respective wearable electronic devices, such as the wearable electronic device 206 and the wearable electronic device 208, to the access control device 230. The access control device 230 is linked to the authentication datastore 220 that provides an association between the first credential and the second credential. In some embodiments, the authentication datastore 220 maintains records of pairs of credentials that, when presented together (e.g. within a predefined time period) provide an authentication signal, as discussed further below.

In the example of FIG. 2, because the two credentials were both presented to the access control device 230 by the wearable electronic device 206 and the wearable electronic device 208 within a predefined time period, the authentication device generates an approval signal, indicating that the two authentication credentials are associated. The approval signal is a green light 240 in the illustrated embodiment of FIG. 2. Alternatively, the approval signal is, for example, a particular user interface dialog or other computer user interface indication on an electronic display controlled by or otherwise associated with the access control device 230.

Figure 4:
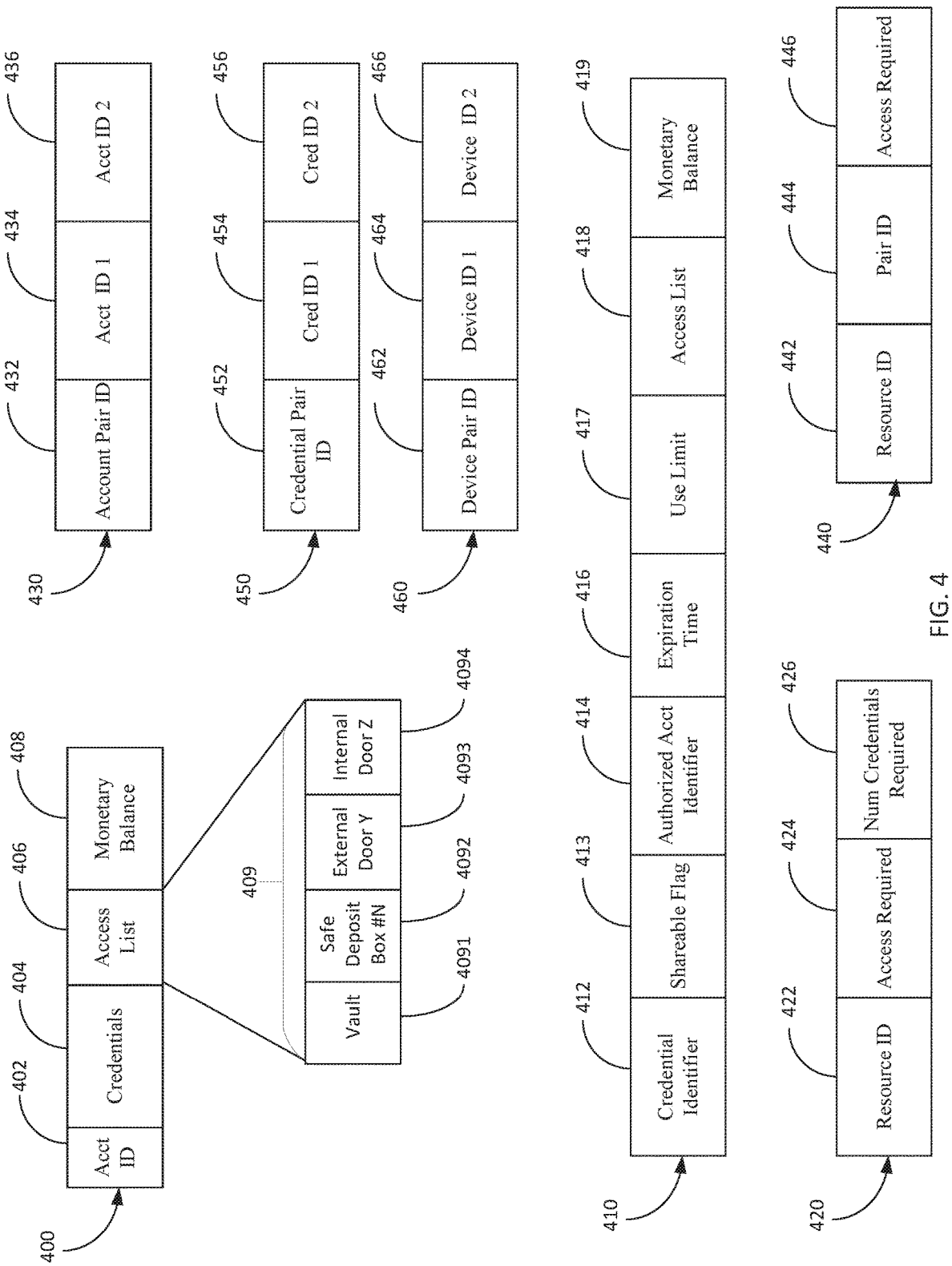
FIG. 4 shows example data structures implemented in one or more of the disclosed embodiments.

Note that while the example of FIG. 2 shows a first wearable electronic device and a second wearable electronic device presenting credentials to the access control device 230, in other embodiments, more than two credentials are necessary to provide access to a resource. For example, as discussed above, various embodiments associate a configurable count of credentials necessary to access the resource (e.g. FIG. 4 shows a number of credentials required field 426 associated with a particular resource).

Figure 3:
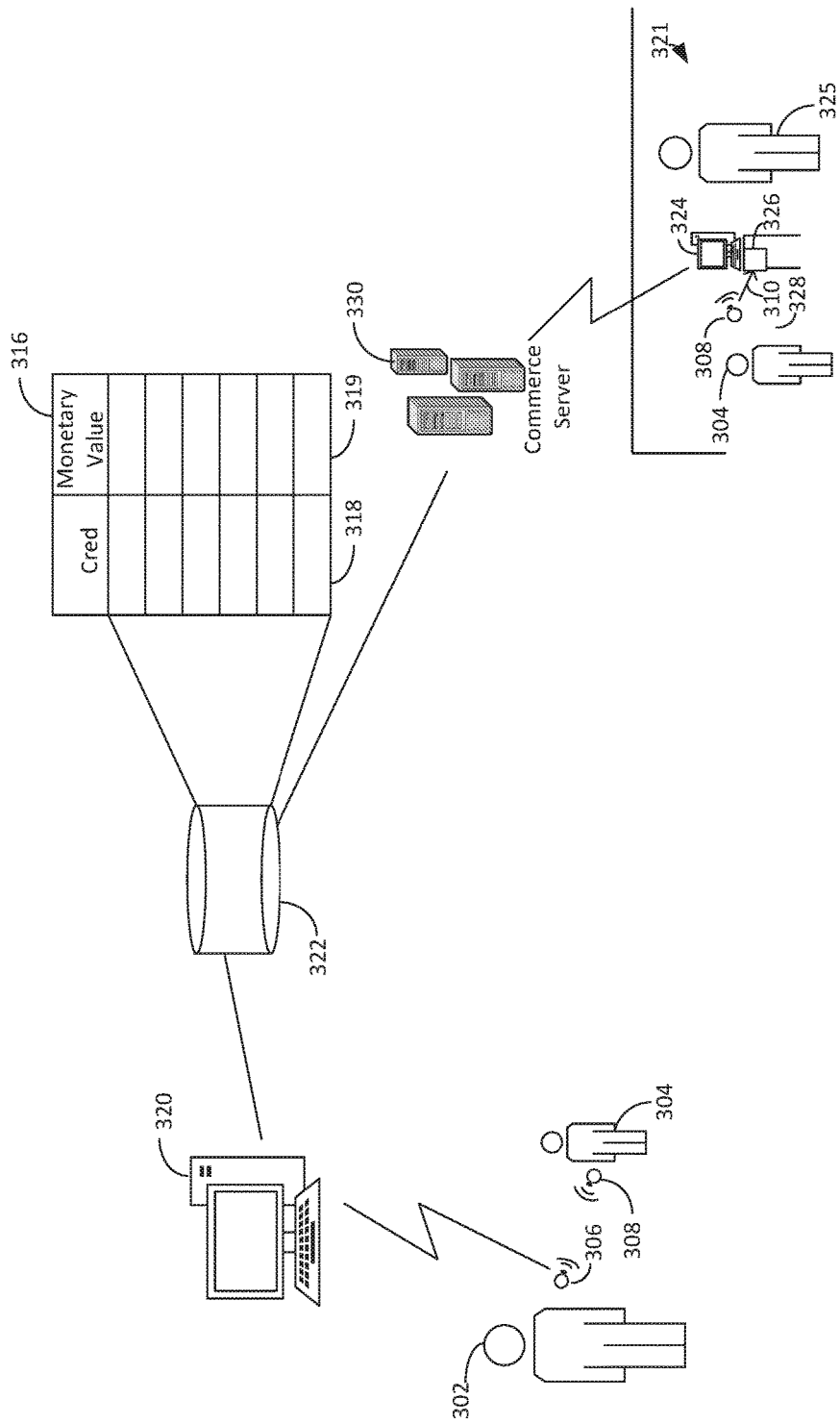
FIG. 3 is another overview diagram demonstrating an implementation including one or more of the disclosed embodiments.

FIG. 3 is another overview diagram demonstrating an implementation including one or more of the disclosed embodiments. FIG. 3 shows a parent 302 and a child 304. Each of the parent 302 and the child 304 are each wearing wearable electronic devices, labeled as a first wearable electronic device 306 and a second wearable electronic device 308 respectively. In the illustrated embodiment, the first wearable electronic device 306 and the second wearable electronic device 308 are rings worn on a finger, but other forms of wearable electronic devices are contemplated.

FIG. 3 shows that the first wearable electronic device 306 and the second wearable electronic device 308 have established near field communication with each other. FIG. 3 shows that the first wearable electronic device 306 passes a credential 310 from to the second wearable electronic device 308. In some embodiments, the passing of the credential 310 to the second wearable electronic device 308 is in response to a gesture made by the parent 302 and/or in combination with a gesture made by the child 304. For example, the transfer is initiated in response to, for example, the parent and child shaking hands, first bumping, or other coordinated gestures between the two individuals causing corresponding motion of their respective wearable electronic deices within a relatively tight time window (e.g. one second, or two seconds).

The credential is mapped to a monetary value via a credential data store 322. In some embodiments, the credential data store 322 is accessed by a computer 320. The computer 320 takes a variety of form factors in various embodiments. For example, the computer 320 is a laptop, desktop, mobile device, or other computer in various embodiments. FIG. 3 also shows one example credential data store format 316. As shown, the credential data store format includes a credential field 318 and a monetary value field 319. In some embodiments, the parent 302 adds a monetary balance to a credential from the parent's account. For example, as discussed further with respect to FIG. 4 below, some embodiments associate a monetary balance with an account that is assigned to or accessible by a particular user, such as the parent 302. This is shown below as monetary balance field 408. The parent 302 is then able to transfer at least a portion of their account balance to a credential. A credential thus has a monetary balance associated with it, at least in some embodiments. This is shown below with respect to monetary balance field 419. In some embodiments, the parent 302 is able to accomplish the management of monetary balances associated with the credential and/or their account via the computer 320, which has access to a credential data store 322. For example, in some embodiments, the parent 302 is able to configure the child's second wearable electronic device 308 to implement a contactless payment method. The parent can accomplish this, in some embodiments, via an online banking portion. In some embodiments, the parent accesses the online banking portal via the computer 320, or via a smart watch, smartphone, and/or web interface. Other settings or rules associated with the child's second wearable electronic device 308 are also potentially configurable via the online banking portal. Alternatively, the parent is able to adjust settings or rules associated with the child's second wearable electronic device 308 via gestures or motions of their own wearable electronic device, such as the first wearable electronic device 306.

In some embodiments, an amount assigned to a credential passed from the first wearable electronic device to the second wearable electronic device (of the child) is also controlled via a gesture. For example, in some embodiments, each incremental gesture adds a predefined amount to the balance. As one example, a first twist sets the amount to $10, a second twist gesture increments the amount to $20, and a third twist gesture increments the amount to #30. A different gesture (e.g. a shake gesture) then authorizes and/or initiates transfer of the credential from the first wearable electronic device 306 to the second wearable electronic device 308. In some embodiments, two different types of inputs to the first wearable electronic device initiate or authorize the transfer of the credential. For example, in some embodiments, a physical motion based gesture combined with a voice command authorizes or initiates transfer of the credential. For example, in some embodiments, shaking hands and verbally saying "Transfer $20" causes the first wearable electronic device to transfer a credential including a $20 monetary balance to the second wearable electronic device.

FIG. 3 shows that after the credential is transferred from the first wearable electronic device 306 of the parent 302 to the second wearable electronic device 308 of the child 304, the child 304 travels to a retail establishment 321. In the retail establishment 321, the child 304 attempts to make a purchase of an item using the monetary balance on the second wearable electronic device 308. To that end, the child 304 interacts with a store attendant 325. Once a transaction is agreed to, the second wearable electronic device 308 communicates the credential 310 to a point of sale terminal 324, via a near field communication device 326 that is electronic coupled to the point of sale terminal 324.

In some embodiments, the child 304 confirms the transfer of the credential 310 to the point of sale terminal 324 using a gesture 328. For example, a twisting or shaking motion gesture confirms the transfer in some embodiments. Upon receiving the credential 310 from the second wearable electronic device 308, the point of sale terminal 324 interacts with an ecommerce server 330 to complete the purchase transaction. The ecommerce server 330 then accesses, either directly or indirectly, the credential data store 322 to confirm the monetary value of the credential 310. In some embodiments, the purchase causing a modification of a monetary balance associated with the credential 310.

FIG. 4 shows example data structures implemented in one or more of the disclosed embodiments. While the example data structures of FIG. 4 are presented and discussed as relational database tables, the disclosed embodiments contemplate the use of a variety of data architectures and are not limited to the examples of FIG. 4. In some embodiments, one or more of the credential data stores 122, 222, or 322 store one or more of the example data structures discussed below with respect to FIG. 4.

FIG. 4 shows an account table 400, credential table 410, a resource table 420, account pairs table 430, second resource table 440, credential pairs table 450, and device pairs table 460. The account table 400 includes an account identifier field 402, user credentials field 404, an access list field 406, and a monetary balance field 408. The account identifier field 402 uniquely identifies a user. For example, the account identifier field 402 uniquely identifies, in some embodiments, the bank manager 102 and the bank employee 104. The user credentials field 404 defines credentials used to authenticate a particular user. In some embodiments, the user credentials field 404 defines an account name and/or an account password. The access list field 406 defines an access list of resources accessible by the user (identified by the account identifier field 402). An example access list 409 is shown. The example access list 409 includes a vault access identifier field 4091, a safe deposit access identifier field 4092, an external door identifier field 4093, and an internal door identifier field 4094. In some embodiments, the access list 409 includes a variable number of access identifier fields, one field for every access granted to the account (the account identified by the account identifier field 402). In some other embodiments, each access list field 406 includes a fixed number of access identifier fields, with a value in each of the fields indicating whether the access is granted to the user/account. The example access identifier fields shown as part of the access list 409 are just examples, and the disclosed embodiments are not limited to access specified by this example.

The credential table 410 includes a credential identifier field 412, sharable flag field 413, authorized account identifier field 414, expiration time field 416, a use limit field 417, access list field 418, and a monetary balance field 419. The credential identifier field 412 uniquely identifies a credential. The sharable flag field 413 indicates whether the credential may be shared with additional accounts/users. The authorized account identifier field 414 indicates one or more users authorized to use the credential (e.g., by storing account id values identified by account identifier field 402). The expiration time field 416 indicates an expiration date/time of the credential. The use limit field 417 indicates, in some embodiments, a number of uses remaining of the credential. Thus, for example, if the use limit field 417 indicates zero uses remaining, the credential is unable to be used. In some embodiments, the use limit field 417 indicates a maximum daily and/or weekly and/or monthly monetary amount that can be transferred from the credential. For example, in these embodiments, a parent transfers an amount from their account balance (e.g. monetary balance field 408) to a credential stored in the credential table 410, and the monetary amount transferred by the parent is represented by the monetary balance field 419. The parent sets, in some embodiments, a daily spending limit for the child to a second amount, which is recorded via the use limit field 417.

The access list field 418 indicates a set of access permissions provided by the credential. In some embodiments, the access list field 418 takes a form similar to that of access list field 406, discussed above. The monetary balance field 419 indicates a monetary balance associated with the credential The monetary balance stored in the monetary balance field 419 can be augmented via funds from a monetary balance field 419 for a particular user.

The resource table 420 includes a resource identifier field 422, an access required field 424, and a number of credentials required field 426. The resource identifier field 422 uniquely identifies a resource. The access required field 424 indicates a type of access required to access the resource. In some embodiments, the access required field 424 identifies a particular one of the access identifier fields included in the access list 409. The number of credentials required field 426 indicates a number of credentials that must be presented within a predefined time period in order to access a resource.

The account pairs table 430 defines pairs of users that are authorized to access resources. The account pairs table 430 includes an account pair identifier field 432, a first account identifier 434 of the pair, and a second account identifier 436 of the pair. The account pair identifier field 432 uniquely identifies a particular pair of users. Each of the first account identifier field 434 and the second account identifier field 436 defining users included in the pair. Each of the first account identifier field 434 and the second account identifier field 436 are cross referenceable with the account identifier field 402.

The second resource table 440 defines pairs of resources that are able to access a resource. The second resource table 440 includes a resource identifier field 442 and a pair identifier field 444. The second resource table 440 also includes an access required field 446. The resource identifier field 442 uniquely identifies a particular resource and functions in a similar manner to the resource identifier field 422. The pair identifier field 444 identifies a pair of resources that can access the resource, with the pair identifier field 444 cross referenceable with any one of more of the account pair identifier field 432, the credential pair identifier field 452, or the device pair identifier field 462, all of which are discussed above. The access required field 446 functions in a similar manner as the access required field 424.

The credential pairs table 450 includes a credential pair identifier field 452, a first credential identifier field 454 and a second credential identifier field 456. The credential pair identifier field 452 uniquely identifies a particular pair of credentials. Each of the first credential identifier field 454 and the second credential identifier field 456 defining credentials included in the credential pair. Each of the first credential identifier field 454 and the second credential identifier field 456 are cross referenceable with the credential identifier field 412.

The device pairs table 460 includes a device pair identifier field 462, a first device identifier field 464 and a second device identifier field 466. The device pair identifier field 462 uniquely identifies a particular pair of devices. Each of the first device identifier field 464 and the second device identifier field 466 defining devices included in the device pair.

Figure 5:
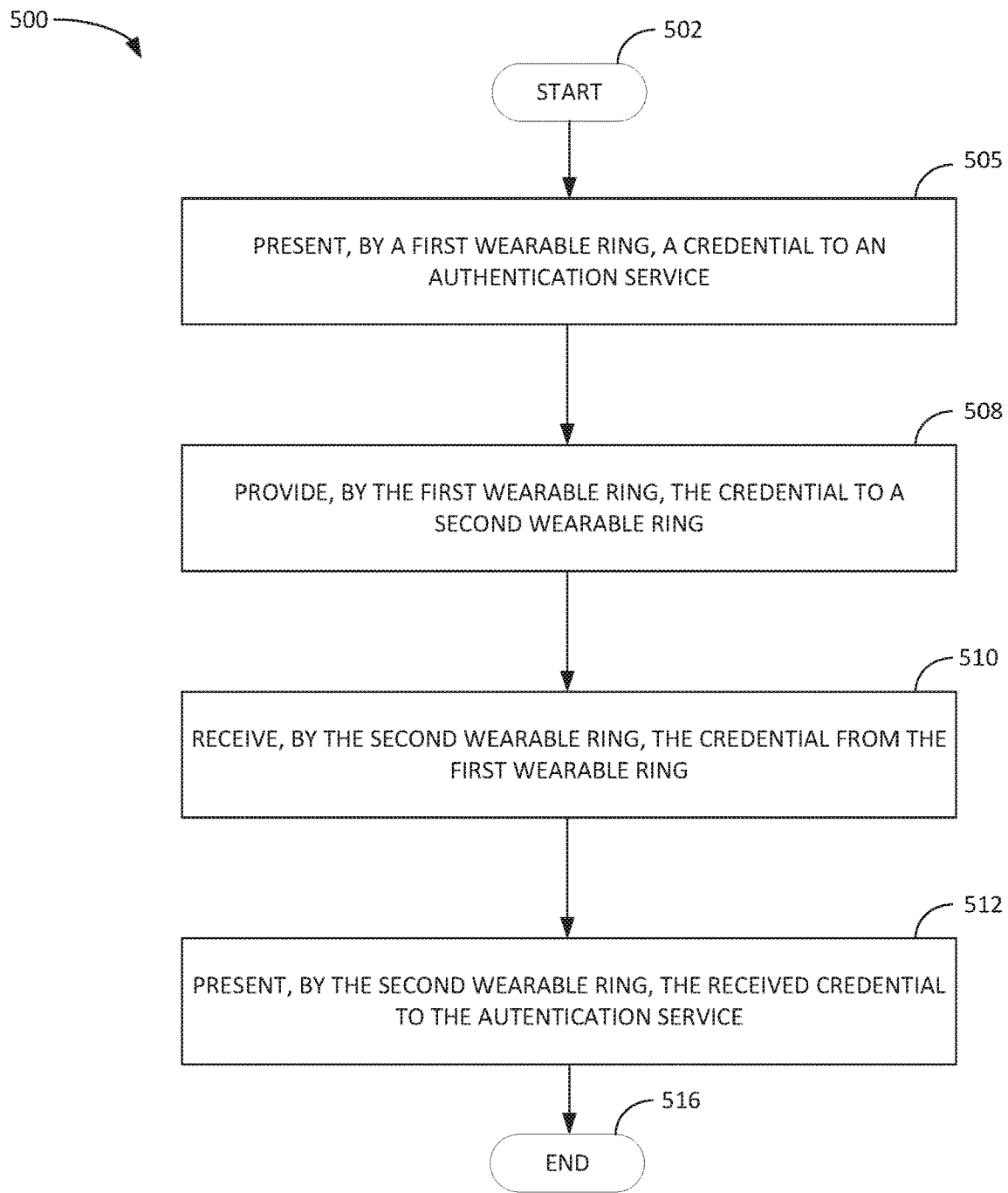
FIG. 5 is a flowchart of an example method of transferring a credential from a first wearable device to a second wearable device.

FIG. 5 is a flowchart of an example method of transferring a credential from a first wearable device to a second wearable device. In some embodiments, one or more of the operations discussed below with respect to FIG. 5 are performed by hardware processing circuitry. For example, in some embodiments, instructions (e.g. 924 discussed below) stored in a memory (e.g. 904 and/or 906 discussed below) configure a hardware processor (e.g. 902 discussed below).

After start operation 502, method 500 moves to operation 505, where a first wearable ring presents a credential to a first authentication service. For example, as discussed above, the first wearable ring is in the possession of, in some embodiments, a manager of a bank. The manager of the bank has a first set of permissions or access rights to bank resources. For example, the bank manager's first wearable electronic device includes a credential that provides access to one or more of a teller cash drawer, bank vault, one or more safety deposit boxes (which in some example embodiments, are physically located within the bank vault), one or more external doors to the bank, one or more doors within the bank, or other bank resources. The first wearable electronic device receives the credential, in some embodiments, from an authentication service, such as the authentication service 120 illustrated in FIG. 1. In some embodiments, the bank manager configures the authentication service 120 via a user interface that is separate from the first wearable electronic device, with the configuration resulting in the authentication service providing the credential to the first wearable electronic device.

In operation 508, the credential is provided to a second wearable electronic device. In some embodiments, the second wearable electronic device is in the form of a ring that is configured to be worn on a finger. In some embodiments, prior to providing the credential to the second wearable electronic device, the first wearable electronic device sets one or more properties of the credential, such as a limit on a number of times the credential is usable to access a resource, an expiration date/time of the transferred credential, an ability of the transferee to perform an additional transfer of the credential to a third device, and/or other properties. In some embodiments, a monetary value is associated with the credential. In these embodiments, before the credential is provided to the second wearable electronic device, the first wearable electronic device sets, in at least some of these embodiments, the monetary value to an amount. The amount is obtained, in some embodiments, via one or more gestures of the first wearable electronic device. In some embodiments, the amount is set via an additional controller device, and transferred to the first wearable electronic device via a wireless link, such as a Bluetooth connection between the controller device and the first wearable electronic device. In some embodiments, the providing of the credential is in response to a gesture or movement of the first wearable electronic device, with the gesture authorizing the providing. In some embodiments, the gesture authorizing the providing is a twisting gesture, which rotates the wearable device about an axis.

In operation 510, the credential is received by the second wearable electronic device. For example, as discussed above with respect to FIG. 1, a bank employee, in some embodiments, receives the credential from the bank manager. By transferring the credential from the first wearable electronic device to the second wearable electronic device, the bank manager is able to transfer some of his authorization to one or more bank resources to the bank employee. Thus, in some embodiments, the credential is mapped to one or more capabilities that are provided to an individual or account presenting the credential.

In operation 512, the second electronic device presents the received credential to an authentication service. In some embodiments, the second authentication service is equivalent to the first authentication service. As discussed above with respect to the example embodiment of FIG. 1, once the bank employee, via their second wearable electronic device, has received the credential from the bank manager, via the bank manager's first wearable electronic device, the bank employee is able to access at least some bank resources accessible to the bank manager. As discussed above, in some embodiments, the transfer of access rights to the bank employee may be limited by one or more of a number of accesses, an elapsed time, or until an expiration date/time.

In some embodiments of method 500, presentation of the credential is preceding by a gesture authorizing the presentation of the credential. In some embodiments, the gesture authorizing the presentation is a twisting gesture, where the second wearable electronic device rotates about an axis.

In response to presenting of the credential by the second wearable electronic device, the authentication service provides access to a resource. In some embodiments, the authentication service transmits a signal that unlocks a safe deposit box, a bank vault, an external door of a financial institution, an internal door within the financial institution, or another resource. In some embodiments, the credential service decrements a count associated with the credential, with the count being used to verify use of the credential is valid. Some embodiments compare the count to a threshold, such as zero, prior to transmitting the signal providing access to the resource.

After operation 512 completes, method 500 moves to end operation 516.

Figure 6:
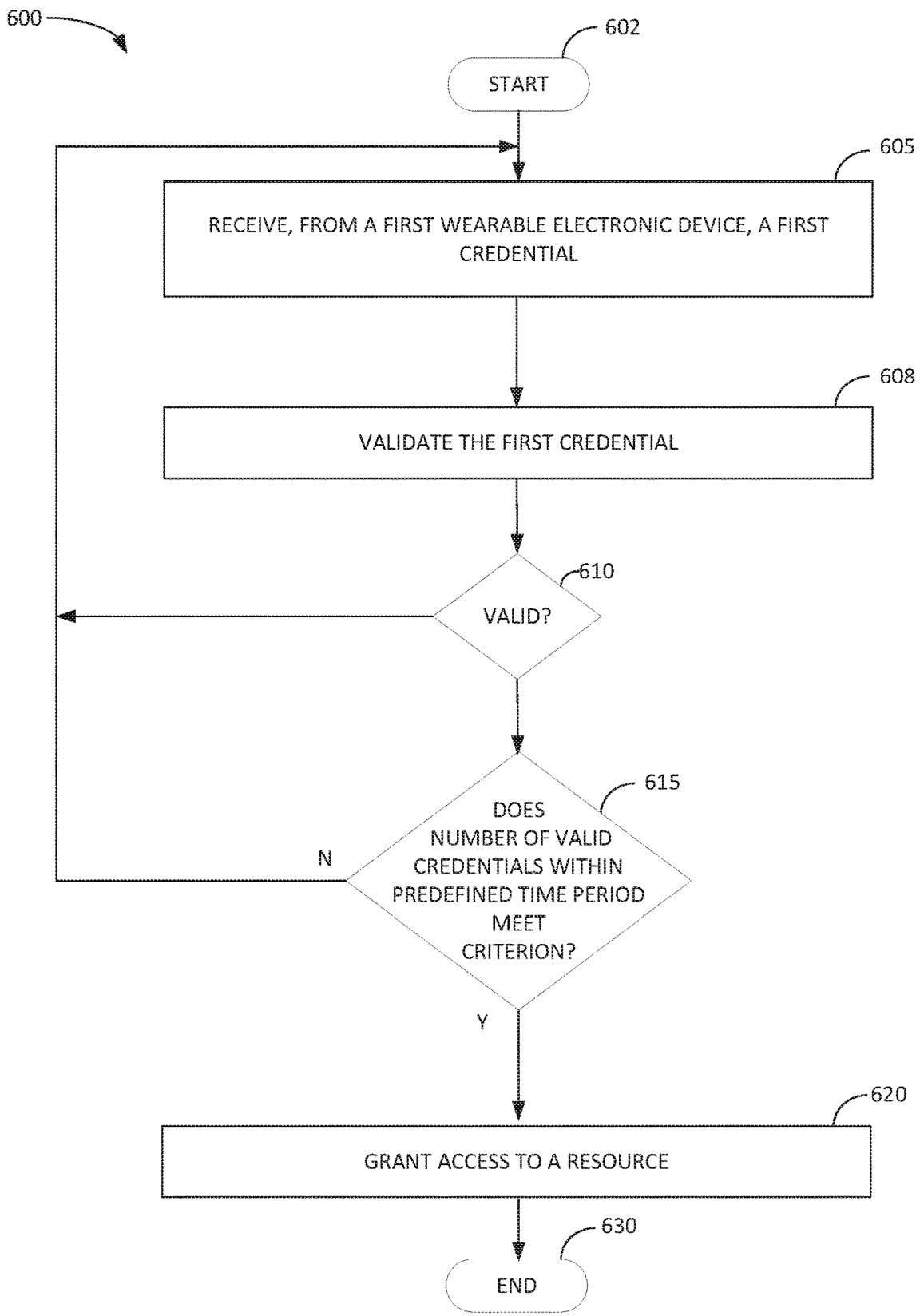
FIG. 6 is a flowchart of an example method of providing access to a resource.

FIG. 6 is a flowchart of an example method of providing access to a resource. In some embodiments, one or more of the operations discussed below with respect to FIG. 6 are performed by hardware processing circuitry. For example, in some embodiments, instructions (e.g. 924 discussed below) stored in a memory (e.g. 904 and/or 906 discussed below) configure a hardware processor (e.g. 902 discussed below).

After start operation 602, method 600 moves to operation 605, where a credential is received from a wearable electronic device. As discussed above, in some embodiments, a wearable electronic device provides a credential to an access control device, such as the access control device 230, discussed above with respect to FIG. 2. In operation 608, the credential is validated. Validating the credential can include, for example, checking the received credential against a credential data store, such as any of the credential data stores 122, 222, 322 discussed above. Validating the credential includes, in some embodiments, confirming whether the credential is currently valid or is expired. Validating the credential also includes, in some embodiments, verifying the credential denotes or indicates an access required for access to a resource controlled by the embodiment of method 600. For example, some embodiments of operation 608 compare an access required to access a resource (e.g. via the access required field 424 of the resource table 420, discussed above) to an access included with the credential (e.g. indicated via access list field 418 of the credential table 410 discussed above in some embodiments). If the access needed is not provided by the credential, some embodiments of operation 608 determine the credential is not valid. If the access needed is provided by the credential, some embodiments of operation 608 determine the credential is valid. If the credential is not valid, method 600 returns to operation 605. If the credential is valid, method 600 moves from decision operation 610 to decision operation 615, which determines is a number of valid credentials provided within a predefined time period meets a criteria. The predefined time period is, in various embodiments, one of one second, two second, three second, four seconds, five seconds, or any time period.

As discussed above, access to one or more resources require more than one credential to be presented in order for the resource to be accessed. As one example, access to a bank vault requires two or more credentials to be presented within a predefined time period before the vault is opened. As discussed above with respect to FIG. 4, the number of credentials required field 426 provides one example of how such a feature is implemented, but of course is just an example and thus is not limiting. In some embodiments, decision operation 615 further verifies whether any of multiple credentials presented within the predefined time period are associated via a predefined pairing, such as the predefined pairings represented by the credential pairs table 450, discussed above with respect to FIG. 4. If the multiple credentials presented within the time period are not represented by a predefined pairing, at combination of multiple credentials is not considered to be included in any count of valid credentials within the predefined time period.

If the number of credentials presented within the predefined time period does not meet the criterion, method 600 returns to operation 605. The criteria measures, in some embodiments, that the number of valid credentials is above a threshold value, such as two, three, four, five, or any number of credentials.

Otherwise, method 600 moves from decision operation 615 to operation 620, where access to the resource is granted. Granting access to a resource includes, in some embodiments, transmitting an electronic signal to control an unlocking of the resource. This can include, for example, an electronically controllable lock to a bank vault, exterior door, interior door, safe deposit box, teller cash drawer, or other resource.

After operation 620 completes, method 600 moves to end operation 630.

Figure 7:
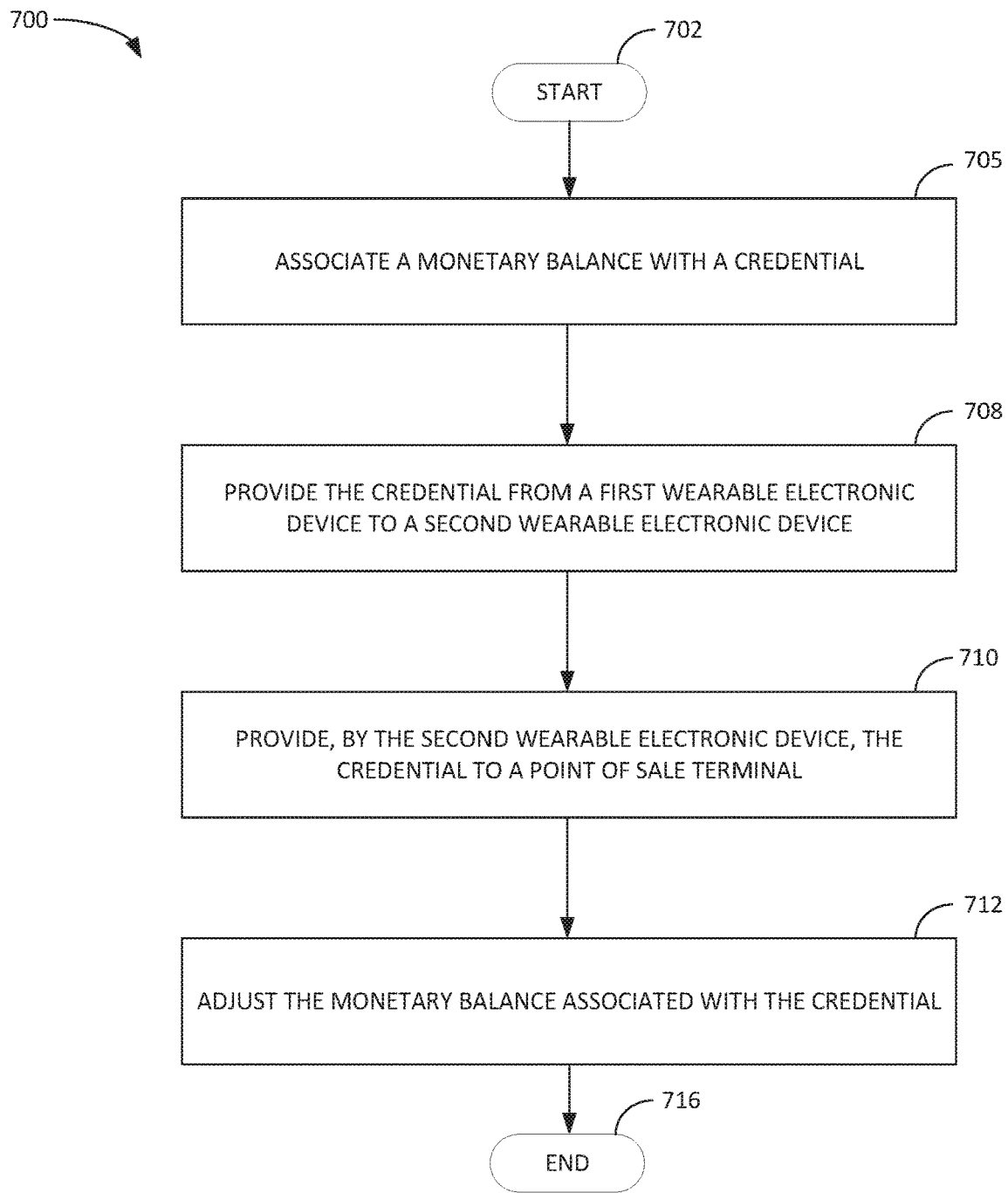
FIG. 7 is a flowchart of an example method of providing access to a resource.

FIG. 7 is a flowchart of an example method of providing access to a resource. In some embodiments, one or more of the operations discussed below with respect to FIG. 7 are performed by hardware processing circuitry. For example, in some embodiments, instructions (e.g. 924 discussed below) stored in a memory (e.g. 904 and/or 906 discussed below) configure a hardware processor (e.g. 902 discussed below).

After start operation 702, method 700 moves to operation 705. In operation 705, a monetary balance is associated with a credential. For example, as discussed above with respect to FIG. 3, the parent 302 associates a monetary balance with a credential. For example, as discussed above with respect to FIG. 4, in some embodiments, a monetary balance associated with a particular user or account (e.g. via monetary balance field 408) with a credential (e.g. adding the balance to the monetary balance field 419). In some embodiments, a first wearable electronic device, such as a smart ring, sets the monetary balance of the credential. For example, as discussed above, some embodiments define a gesture that increments a balance of a credential. The increment of the credential's balance is funded, in some embodiments, by an account linked to the first wearable electronic device (e.g. an account identified in the account table 400 of FIG. 4 in some embodiments). Thus, in an example use case, a parent performs a balance increment gesture four times, with each increment defined as $10, resulting in a $40 balance on the credential. The parent then performs an additional, likely different gesture, to signal the credential is transferred to a child's second wearable electronic device, in one example embodiment of operation 708, discussed below.

In operation 708, the credential is provided by a first wearable electronic device to a second wearable electronic device. Again, as discussed above with respect to the example of FIG. 3, the parent 302 transfers the credential to the child 304, by transferring the credential from the first wearable electronic device 306 to the second wearable electronic device 308. In some embodiments, the credential is provided to the second wearable electronic device based on a property of the credential indicating the credential is sharable (e.g. via the shareable flag field 413 discussed above with respect to FIG. 4).

In operation 710, the second wearable electronic device provides the credential to a point of sale terminal. As discussed above with respect to the example embodiment of FIG. 3, some embodiments of operation 710 transfer the credential to a point of sale terminal 324 via, in some embodiments, a near field communication device 326.

In operation 712, the monetary balance associated with the credential is adjusted. For example, in some embodiments, the point of sale terminal 324 interfaces with a ecommerce service, such as the ecommerce server 330 discussed above with respect to FIG. 3. The communication presents the credential and a payment amount. The commerce server then checks a credential data store, such as credential data store 322 to verify whether the presented credential has a balance adequate to cover the payment amount. If so, the payment amount is deducted from the credentials monetary balance (e.g. via monetary balance field 419 in some embodiments), and the point of sale terminal 324 is notified that payment was successful.

After operation 712 is complete, method 700 moves to end operation 716.

Figure 8:
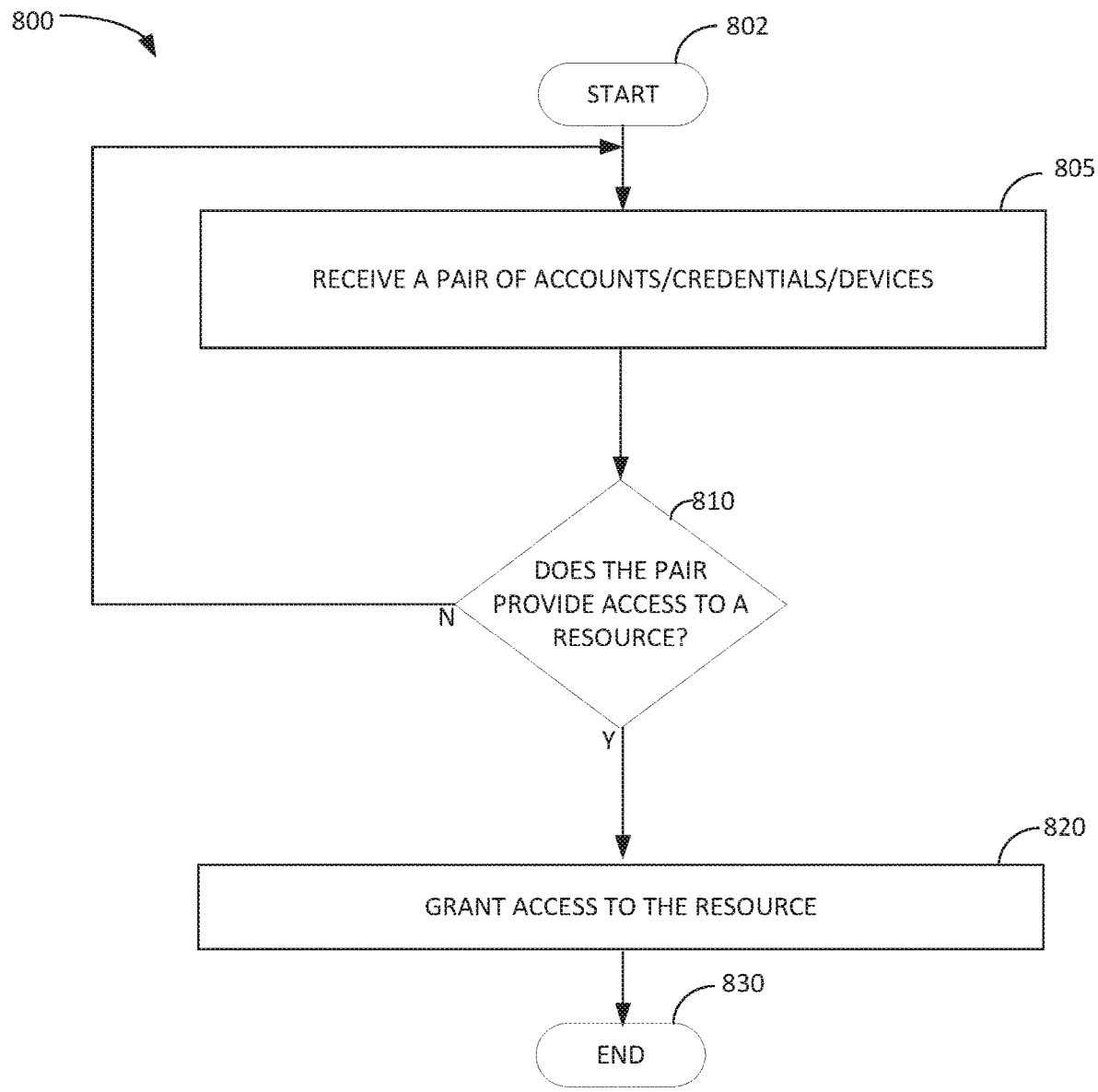
FIG. 8 is a flowchart of an example method of providing access to a resource.

FIG. 8 is a flowchart of an example method of providing access to a resource. In some embodiments, one or more of the operations discussed below with respect to FIG. 8 are performed by hardware processing circuitry. For example, in some embodiments, instructions (e.g. 924 discussed below) stored in a memory (e.g. 904 and/or 906 discussed below) configure a hardware processor (e.g. 902 discussed below).

After start operation 802, method 800 moves to operation 805, which receives a pair of users or credentials, or device identifiers. For example, as discussed above with respect to FIG. 2, an access control device 230 receives wireless signals identifying the pair. The pair is provided via a wireless communications link by two wearable electronic devices, such as the first wearable electronic device 106 and the second wearable electronic device 108 of FIGS. 2, 206 and 208 of FIG. 2, or 306 and 308 of FIG. 3. In some embodiments, the wireless communication link is a near field communications link.

Decision operation 810 determines whether the pair is authorized to provide access to a resource. For example, as discussed above with respect to FIG. 4, some embodiments maintain a mapping between a resource and one or more pairs of devices authorized to access the resource. Specifically, with respect to the example of FIG. 4, the second resource table 440 identifies a resource (e.g. via resource identifier field 442), and one or more pairs of resources authorized to access the resource (e.g. via one or more rows of the second resource table 440 and the pair identifier field 444. The pair identifier field 444 is configured to identify a pair in any one of the account pairs table 430, credential pairs table 450, or the device pairs table 460.

In operation 820, access is granted to the resource. In some embodiments, access to the resource includes using the pair of users/credentials/devices as a trusted network indicator. In some embodiments, granting access to a resource includes opening a bank vault, teller cash drawer, exterior or interior door, safe deposit box or set of safe deposit boxes, or providing access to any other type of resource. For example, in some embodiments, a bank vault (e.g. a resource identified in the second resource table 440 in some embodiments) is configured to only open when it detects the presence of at least two individuals, via the individuals separate wearable electronic devices, which are identified as pairs of devices authorized to access the bank vault (e.g. in some embodiments, via the pair of devices including an entry in the device pairs table 0.460 and that pair of devices identified via the pair identifier field 444 of the bank vault resource).

In some embodiments, the resource is a third device. For example, in some embodiments, the pairing authorizes a parent, via the first wearable electronic device, to control an amount of usage of a third device that the child has access to. The pairing between parent and child is identified via pairing of either an account of the parent and an account of the child (e.g. via the account table 400, credentials of each of the parent and child (e.g., via the credential table 410 and the credential pairs table 450), or by the first and second wearable electronic devices themselves (e.g., via the device pairs table 460).

In some embodiments, the resource is information in a database. For example, in some embodiments, access to the resource provides access to "know your customer" information. The information, in some embodiments, is encrypted. A credential provides a method of decrypting the information and providing access.

In some embodiments, the resource is a device, that is under dual control of the two wearable electronic devices identified by the pair. For example, in some embodiments, a video game accepts control inputs from two wearable electronic devices included in the pair received in operation 805. Each electronic device controls, in some embodiments, a different player in the video game.

After operation 820 is complete, method 800 moves to end operation 830.

Figure 9:
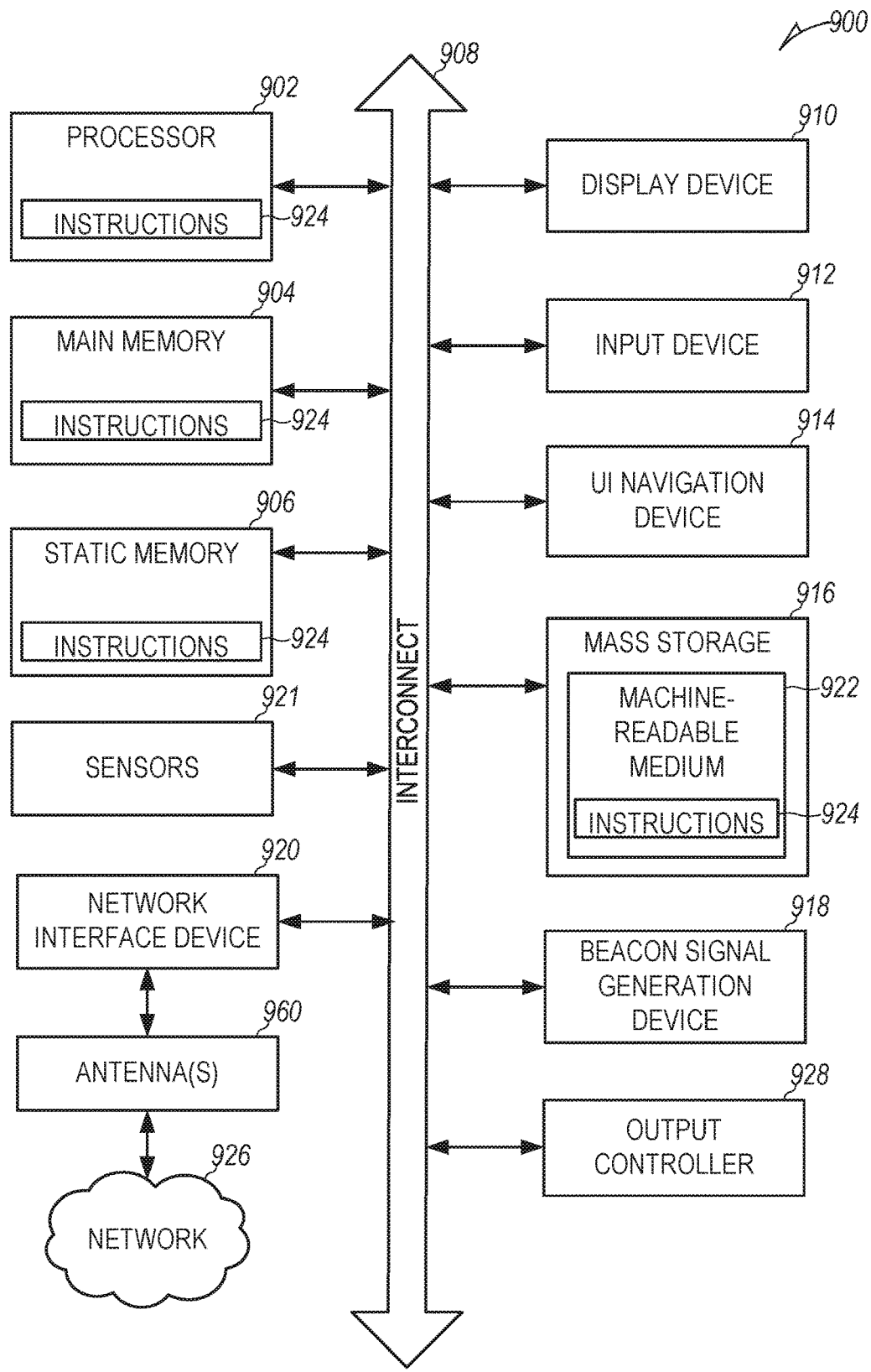
FIG. 9 illustrates a block diagram of an example machine upon which any one or more of the disclosed embodiments operate.

FIG. 9 illustrates a block diagram of an example machine 900 upon which any one or more of the techniques (e.g., methodologies) discussed herein may perform. Machine 900 (e.g., computer system) may include a hardware processor 902 (e.g., a central processing unit (CPU), a graphics processing unit (GPU), a hardware processor core, or any combination thereof), a main memory 904 and a static memory 906, some or all of which may communicate with each other via an interlink 908 (e.g., bus).

Specific examples of main memory 904 include Random Access Memory (RAM), and semiconductor memory devices, which may include, in some embodiments, storage locations in semiconductors such as registers. Specific examples of static memory 906 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 900 may further include a display device 910, an input device 912 (e.g., a keyboard), and a user interface (UI) navigation device 914 (e.g., a mouse). In an example, the display device 910, input device 912 and UI navigation device 914 may be a touch screen display. The machine 900 may additionally include a mass storage device (e.g., drive unit) 916, a beacon signal generation device 918, a network interface device 920, and one or more sensors 921, such as a global positioning system (GPS) sensor, compass, accelerometer, microphone, motion sensor, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 902 and/or instructions 924 may comprise processing circuitry and/or transceiver circuitry.

The mass storage device 916 may include a machine readable medium 922 on which is stored one or more sets of data structures or instructions 924 (e.g., software) embodying or utilized by any one or more of the techniques or functions described herein. The machine readable medium 922 is a non-transitory computer readable storage medium in at least some embodiments. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the mass storage device 916 may constitute machine readable media.

Specific examples of machine-readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 922 is illustrated as a single medium, the term "machine readable medium" may include a single medium or multiple media (e.g., a centralized or distributed database, and/or associated caches and servers) configured to store the instructions 924.

An apparatus of the machine 900 may be one or more of a hardware processor 902 (e.g., a central processing unit (CPU), a graphics processing unit (GPU), a hardware processor core, or any combination thereof), one or more hardware memories, including one or more of a main memory 904 and a static memory 906. The apparatus of the machine 900 also includes, in some embodiments, one or more sensors 921, network interface device 920, one or more antennas 960, a display device 910, an input device 912, a UI navigation device 914, a mass storage device 916, instructions 924, a beacon signal generation device 918, and an output controller 928. The apparatus may be configured to perform one or more of the methods and/or operations disclosed herein. The apparatus may be intended as a component of the machine 900 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 920 may include one or more physical jacks (e.g., Ethernet, coaxial, or phone jacks) or one or more antennas to connect to the communications network 926. In an example, the network interface device 920 may include one or more antennas 960 to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Examples, as described herein, may include, or may operate on, logic or a number of components, modules, or mechanisms. Modules are tangible entities (e.g., hardware)

capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the operations of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

The invention claimed is:

1. A system comprising
a first wearable ring, comprising:
a motion sensor;
hardware processing circuitry in communication with the motion sensor, the hardware processing circuitry configured to perform first operations comprising:
detecting a first physical motion comprising one of a hand motion, a rotation of the first wearable ring, or a wrist motion based on a first movement of the first wearable ring detected by the motion sensor;
performing a first action based on detecting the first physical motion, the first action including providing a credential to a second wearable ring;
detecting:
a second physical motion comprising one of a hand motion, a rotation of the first wearable ring, or a wrist motion based on a second movement of the first wearable ring detected by the motion sensor; and
a number of times the second physical motion is performed, the second physical motion being different from the first physical motion where the first physical motion is one of the hand motion, the rotation of the first wearable ring, or the wrist motion and the second physical motion is another of the hand motion, the rotation of the first wearable ring, or the wrist motion; and
performing a second action based on:
detecting the second physical motion; and
detecting the number of times the second physical motion was performed, the second action being different from the first action, the second action relating to an action other than providing a credential, wherein different actions are associated with a different number of times the second physical motion was performed, the detected number of times corresponding to an amount associated with performing the second action; and
the second wearable ring comprising:
second hardware processing circuitry configured to perform second operations comprising:
receiving the credential from the first wearable ring, and
presenting the received credential to an authentication service.

2. The system of claim 1, further comprising an access control device, wherein the access control device is configured to generate an authorization signal in response to receiving the credential from the first wearable ring and the second wearable ring within a predefined time period.

3. The system of claim 2, wherein the authorization signal is configured to unlock a lock mechanism.

4. The system of claim 1, the first operations further comprising:
setting a time limit on the credential based on the second physical motion; and
communicating the time limit to the second wearable ring, the second operations further comprising limiting presentation of the received credential in accordance with the time limit.

5. The system of claim 1, the first operations further comprising setting a use count limit on the credential based on the second physical motion.

6. The system of claim 1, wherein the authentication service controls access to a safe deposit box, a bank vault, or a door.

7. The system of claim 1, wherein the authentication service controls an indicator light.

8. The system of claim 1, the first operations further comprising establishing near field communication with the second wearable ring, wherein providing the credential occurs via the near field communication.

9. The system of claim 1, wherein the credential indicates a monetary balance.

10. The system of claim 9, the first operations further comprising incrementing the monetary balance based on detecting of the first physical motion.

11. The system of claim 1, the first operations further comprising receiving, from a control device, an indication that the credential is sharable, wherein providing the credential to the second wearable ring is in response to the indication.

12. A method comprising:
detecting a first physical motion comprising one of a hand motion, a rotation of a first wearable electronic device, or a wrist motion based on a first movement of the first wearable electronic device detected by a motion sensor of a first wearable electronic device;
performing a first action based on detecting the first physical motion, the first action including providing a credential to a second wearable electronic device;
detecting:
a second physical motion comprising one of a hand motion, a rotation of the first wearable electronic device, or a wrist motion based on a second movement of the first wearable electronic device detected by the motion sensor; and
a number of times the second physical motion is performed, the second physical motion being different from the first physical motion where the first physical motion is one of the hand motion, the rotation of the first wearable electronic device, or the wrist motion and the second physical motion is another of the hand motion, the rotation of the first wearable electronic device, or the wrist motion;
performing a second action based on:
detecting the second physical motion; and
detecting the number of times the second physical motion was performed, the second action being different from the first action, the second action relating to an action other than providing a credential, wherein different actions are associated with a different number of times the second physical motion was performed, the detected number of times corresponding to an amount associated with performing the second action;
receiving, by the second wearable electronic device, the credential from the first wearable electronic device; and
presenting, by the second wearable electronic device, the received credential to an authentication service.

13. The method of claim 12, further comprising:
incrementing, by the first wearable electronic device, a monetary balance assigned to the credential based on detecting of the first physical motion; and
setting a daily limit on spending of the monetary balance based on detecting of the second physical motion.

14. A non-transitory computer readable storage medium comprising instructions that when executed configure hardware processing circuitry to perform operations comprising:

detecting a first physical motion comprising one of a hand motion, a rotation of a first wearable electronic device, or a wrist motion based on a first movement of the first wearable electronic device detected by a motion sensor of the first wearable electronic device;

performing a first action based on detecting the first physical motion, the first action including providing a credential to a second wearable electronic device;

detecting:
  a second physical motion comprising one of a hand motion, a rotation of the first wearable electronic device, or a wrist motion based on a second movement of the first wearable electronic device detected by the motion sensor; and
  a number of times the second physical motion is performed, the second physical motion being different from the first physical motion where the first physical motion is one of the hand motion, the rotation of the first wearable electronic device, or the wrist motion and the second physical motion is another of the hand motion, the rotation of the first wearable electronic device, or the wrist motion;

performing a second action based on:
  detecting the second physical motion; and
  detecting the number of times the second physical motion was performed, the second action being different from the first action, the second action relating to an action other than providing a credential, wherein different actions are associated with a different number of times the second physical motion was performed, the detected number of times corresponding to an amount associated with performing the second action;

receiving, by the second wearable electronic device, the credential from the first wearable electronic device; and presenting, by the second wearable electronic device, the received credential to an authentication service.

* * * * *